United States Patent
Schweinzger

(10) Patent No.: US 11,680,021 B2
(45) Date of Patent: Jun. 20, 2023

(54) POLYCRYSTALLINE CERAMIC SOLID AND METHOD FOR PRODUCING A POLYCRYSTALLINE CERAMIC SOLID

(71) Applicant: TDK Electronics AG, Munich (DE)

(72) Inventor: Manfred Schweinzger, Schwanberg (AT)

(73) Assignee: TDK ELECTRONICS AG, Munich (DE)

( * ) Notice: Subject to any disclaimer, the term of this patent is extended or adjusted under 35 U.S.C. 154(b) by 256 days.

(21) Appl. No.: 16/978,147

(22) PCT Filed: Mar. 13, 2018

(86) PCT No.: PCT/EP2018/056263
§ 371 (c)(1),
(2) Date: Sep. 3, 2020

(87) PCT Pub. No.: WO2019/174719
PCT Pub. Date: Sep. 19, 2019

(65) Prior Publication Data
US 2021/0078907 A1   Mar. 18, 2021

(51) Int. Cl.
C04B 35/499 (2006.01)
C04B 35/626 (2006.01)

(52) U.S. Cl.
CPC ...... *C04B 35/499* (2013.01); *C04B 35/62675* (2013.01); *C04B 2235/3206* (2013.01);
(Continued)

(58) Field of Classification Search
CPC ............ C04B 35/499; C04B 35/62675; C04B 2235/3206; C04B 2235/3234;
(Continued)

(56) References Cited

U.S. PATENT DOCUMENTS 4,716,134 A * 12/1987 Yamaguchi .......... H01G 4/1254
501/135
5,135,897 A    8/1992 Uchino et al.
9,887,398 B2   2/2018 Yun et al.

FOREIGN PATENT DOCUMENTS

CN   102659404 A   9/2012
CN   102757232 A   10/2012
(Continued)

OTHER PUBLICATIONS

Kelly et al. Effect of Composition on the Electromechanical Properties of (1-x)Pb(Mg1/3Nb2/3)O3-xPbTiO3 Ceramics. J. Am. Ceram. Soc., 80[4] 957-64 (1997).*
(Continued)

*Primary Examiner* — Noah S Wiese
(74) *Attorney, Agent, or Firm* — Slater Matsil, LLP

(57) ABSTRACT

A polycrystalline ceramic solid and a method for producing a polycrystalline ceramic solid are disclosed. In an embodiment a polycrystalline ceramic solid includes a main phase with a composition of the general formula: $(1-y)Pb_a(Mg_bNb_c)O_{3-e}+yPb_aTi_dO_3$ with $0.055 \leq y \leq 0.065$, $0.95 \leq a \leq 1.02$, $0.29 \leq b \leq 0.36$, $0.63 \leq c \leq 0.69$, $0.9 \leq d \leq 1.1$, and $0 \leq e \leq 0.1$, and optionally one or more secondary phases, wherein, in each section through the solid, a proportion of the secondary phases relative to any given cross-sectional area through the solid is less than or equal to 0.5 percent, or wherein the solid is free of the secondary phases.

21 Claims, 11 Drawing Sheets

Reference

(52) U.S. Cl.
CPC ............... *C04B 2235/3234* (2013.01); *C04B 2235/3255* (2013.01); *C04B 2235/612* (2013.01); *C04B 2235/6587* (2013.01); *C04B 2235/768* (2013.01); *C04B 2235/786* (2013.01); *C04B 2235/79* (2013.01); *C04B 2235/81* (2013.01)

(58) Field of Classification Search
CPC .... C04B 2235/3255; C04B 2235/6587; C04B 2235/768; C04B 2235/79; C04B 2235/81; C04B 2235/3251
See application file for complete search history.

(56) References Cited

FOREIGN PATENT DOCUMENTS

| | | |
|---|---|---|
| CN | 103304235 A | 9/2013 |
| CN | 107473743 A | 12/2017 |
| CN | 107500764 A | 12/2017 |
| EP | 0221696 A2 | 5/1987 |
| JP | H0294579 A | 4/1990 |
| JP | H0324913 A | 10/1991 |
| JP | H0432213 A | 2/1992 |
| JP | H06283378 A | 10/1994 |
| JP | 6128619 B2 | 5/2017 |
| WO | 0026924 A1 | 5/2000 |

OTHER PUBLICATIONS

Costa et al. Direct synthesis of PMN samples by spray-drying. Journal of the European Ceramic Society 22 (2002) 2093-2100.*

A.Y. Liu, et al., "Electrical and Optical Properties of Pb (Mg1/3Nb2/3) O3-PbTiO3 Thin Films Prepared by Chemical Solution Deposition," Applied Physics Letters 87, Aug. 9, 2005, 3 pages.

Aiyun Liu, et al., "Study on the Electrical and Optical Properties of Pb (Mg1/3Nb2/3) O3-PbTiO3 Thin Films Deposited by a Chemical Solution Method," Elsevier, Science Direct, Journal of Crystal Growth 290, Feb. 3, 2006, 4 pages.

A. R. James, et al., "LowTemperature Fabrication and Impedance Spectroscopy of PMN-PT Ceramics," Pergamon, Materials Research Bulletin, vol. 34, No. 8, pp. 1301-1310, Oct. 8, 1998.

E. M. Sabolsky, et al., "Piezoelectric Properties of <001> Textured Pb(Mg1/3Nb2/3)O3-PbTiO3 Ceramics," Applied Physics Letters, vol. 78, No. 17, Apr. 23, 2001, 3 pages.

Fumiya Kurokawa, et al., "Compositional Dependence of Pb (Mg1/3,Nb2/3) O3-PbTiO3 Piezoelectric Thin Films by Combinatorial Sputtering," Japanese Journal of Applied Physics 53, 09PA06, Sep. 3, 2014, 4 pages.

J. Q. Xue, et al., "Optical Properties of 92%Pb(Mg1/3Nb2/3)O3-8%PbTiO3 Thin Films Prepared by Chemical Solution Deposition," Journal of Applied Physics 100, 104107, Nov. 22, 2006, 4 pages.

Joe Kelly, et al., "Effect of Composition on the Electromechanical Properties of (1-x)Pb(Mg 1/3 Nb 2/3)O3-xPbTiO3 Ceramics," Journal of the American Ceramic Society, vol. 80, No. 4, Oct. 23, 1996, 8 pages.

Kyle G. Webber, et al., "Ceramic and Single-Crystal (1-x)PMN-xPT Constitutive Behavior Under Combined Stress and Electric Field Loading," Elsevier, Science Direct, Acta Materilia 56, Jan. 14, 2008, 9 pages.

Lili Zhao, et al., "Effect of Excess PbO and Sintering Temperature on the Templated Grain Growth of Pb (Mg1/3Nb2/3)0.6/TiO.3303 Polycrystals," Journal of Materials Science 40, 2005, Aug. 12, 2004, 5 pages.

Mie Marsilius, et al., "Mechanical Confinement: An Effective Way of Tuning Properties of Piezoelectric Crystals," Advanced Functional Materials vol. 22, Dec. 16, 2011, 6 pages.

Pawan Kumar, et al., "Ferroelectric Properties of Bulk and Thin Films of PMNT System," Elsevier, Physica B 357, Science Direct, Jul. 31, 2004, 7 pages.

Takashi Arai, et al., "Effects of Synthesis Conditions on Electrical Properties of Chemical Solution Deposition-Derived Pb(Mg1/3Nb2/3)O3-PbTiO3 Thin Films," Elsevier, Thin Solid Films 585, Science Direct, Nov. 13, 2014, 5 pages.

Xiaowei Wen, et al., "Dielectric Tunability and Imprint Effect in Pb(Mg1/3Nb2/3)O3-PbTiO3 Ceramics," Elsevier Ceramics International 33, Apr. 18, 2006, 5 pages.

* cited by examiner

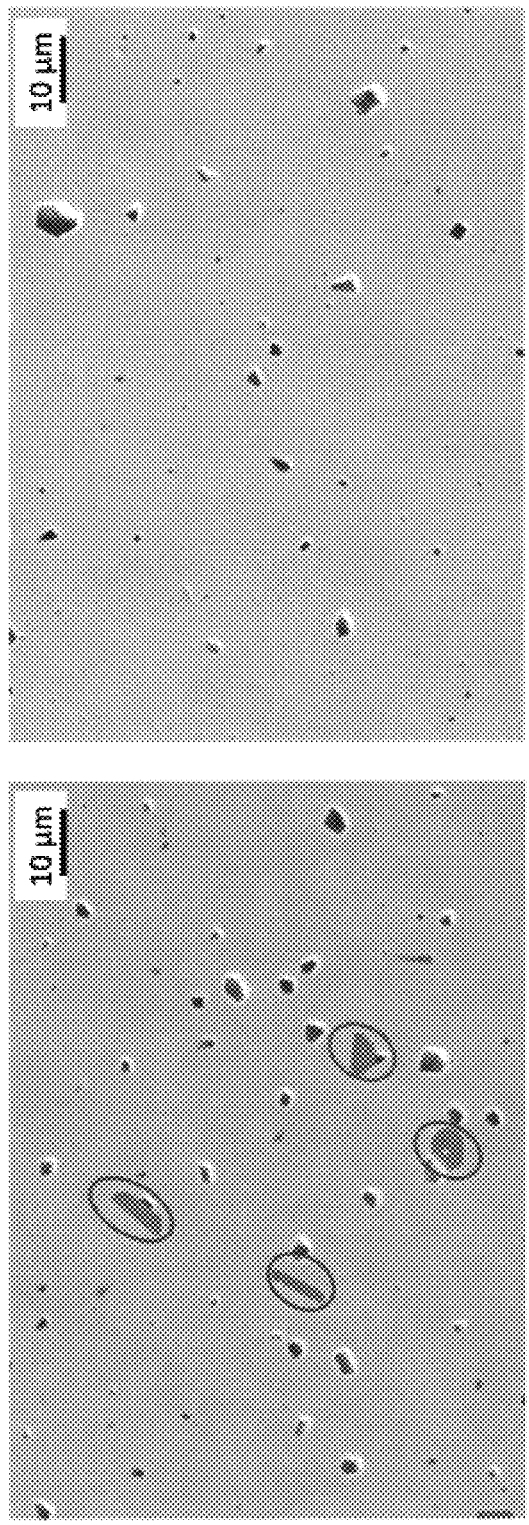

Fig. 3B Specimen Mg Kα1_2
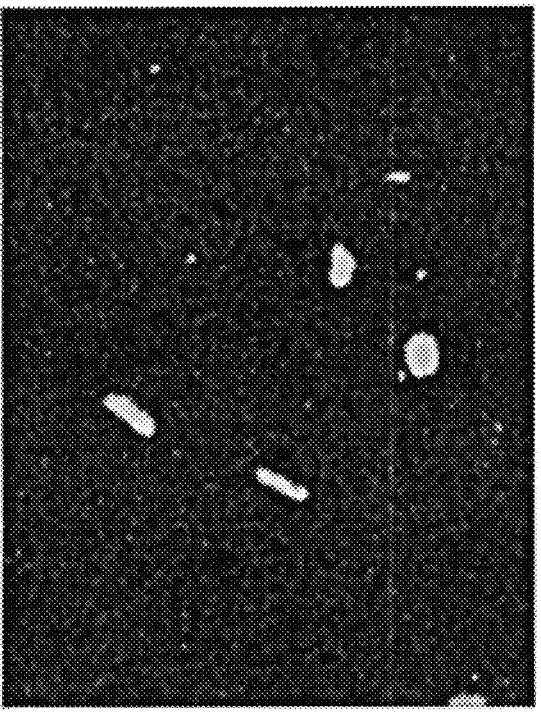
Fig. 3A Reference Mg Kα1_2

Fig. 4A

Reference: Main phase

| [Atom%] | O | Mg | Ti | Nb | Pb |
|---|---|---|---|---|---|
| Spectrum 1 | 58.39 | 6.42 | 1.64 | 13.31 | 20.24 |
| Spectrum 2 | 58.02 | 6.32 | 1.8 | 13.44 | 20.42 |
| Spectrum 3 | 57.87 | 6.8 | 1.7 | 13.39 | 20.24 |
| Spectrum 4 | 58.01 | 6.44 | 1.76 | 13.4 | 20.4 |
| Average |  | 6.50 | 1.73 | 13.39 | 20.33 |
| +/- |  | 0.21 | 0.07 | 0.05 | 0.10 |
| Formula |  | 0.301 | 0.080 | 0.620 | 0.941 |
| +/- |  | 0.010 | 0.003 | 0.003 | 0.005 |
| As weighed out |  | 0.313 | 0.060 | 0.626 | 1.000 |

Fig. 4B

Reference: Secondary phase

| [Atom%] | O | Mg | Ti | Nb | Pb |
|---|---|---|---|---|---|
| Spectrum 1 | 58.4 | 26.43 | 0.69 | 13.96 | 0.52 |
| Spectrum 2 | 58.08 | 26.81 | 0.77 | 14.13 | 0.21 |
| Spectrum 3 | 58.02 | 26.84 | 0.77 | 14.02 | 0.35 |
| Spectrum 4 | 58.77 | 25.43 | 0.64 | 13.84 | 1.18 |
| Average | | 26.38 | 0.718 | 13.99 | 0.565 |
| +/- | | 0.66 | 0.064 | 0.12 | 0.43 |
| Formula | | 0.642 | 0.017 | 0.340 | 0.014 |
| +/- | | 0.016 | 0.002 | 0.003 | 0.010 |

Fig. 5

Reference: Main phase

| [Atom%] | O | Mg | Ti | Nb | Pb |
|---|---|---|---|---|---|
| Spectrum 1 | 58.43 | 6.36 | 1.27 | 13.47 | 20.47 |
| Spectrum 2 | 57.86 | 6.48 | 1.36 | 13.5 | 20.8 |
| Spectrum 3 | 57.76 | 6.4 | 1.3 | 13.64 | 20.9 |
| Spectrum 4 | 58.05 | 6.31 | 1.3 | 13.56 | 20.78 |
| Average | | 6.39 | 1.31 | 13.54 | 20.74 |
| +/- | | 0.07 | 0.04 | 0.08 | 0.19 |
| Formula | | 0.301 | 0.062 | 0.638 | 0.976 |
| +/- | | 0.003 | 0.002 | 0.004 | 0.009 |
| As weighed out | | 0.313 | 0.060 | 0.626 | 1.000 |

Reference

| Measurement | Mean value | +/- |
|---|---|---|
| ECD (equal circle diameter) (μm) | 3.79 | 1.53 |
| Area (μm²) | 13.14 | 10.7 |
| Length (μm) | 4.94 | 1.86 |
| Aspect ratio | 1.49 | 0.4 |
| Circumference (μm) | 12.91 | 5.36 |

Fig. 7A

Specimen

| Measurement | Mean value | +/- |
|---|---|---|
| ECD (equal circle diameter) (μm) | 5.32 | 2.49 |
| Area (μm²) | 27.05 | 24.75 |
| Length (μm) | 7.1 | 3.01 |
| Aspect ratio | 1.64 | 0.59 |
| Circumference (μm) | 18.68 | 8.78 |

Fig. 7B

POLYCRYSTALLINE CERAMIC SOLID AND METHOD FOR PRODUCING A POLYCRYSTALLINE CERAMIC SOLID

This patent application is a national phase filing under section 371 of PCT/EP2018/056263, filed Mar. 13, 2018, of which is incorporated herein by reference in its entirety.

TECHNICAL FIELD

The invention relates to a polycrystalline, ceramic solid. The invention further relates to an electrode comprising the ceramic solid. Finally, the invention relates to a method for producing a ceramic solid and an electrode comprising the solid. Numerous ceramic electrode materials are known from the prior art. There is significant need for materials which are suitable for use in electrodes and exhibit improved characteristics with regard to electrode efficiency and power loss.

SUMMARY OF THE INVENTION

Embodiments provide new materials which are suitable for use in electrodes.

Embodiments provide a polycrystalline, ceramic solid comprising:

a main phase with a composition of the following general formula:

$$(1-y)Pb_a(Mg_bNb_c)O_{3-e} + yPb_aTi_dO_3,$$

with $0.055 \leq y \leq 0.065$;
$0.95 \leq a \leq 1.02$,
$0.29 \leq b \leq 0.36$,
$0.63 \leq c \leq 0.69$,
$0.9 \leq d \leq 1.1$, and
$0 \leq e \leq 0.1$; and
and optionally one or more secondary phases,
wherein in each section through the solid, the proportion of secondary phases relative to any given cross-sectional area through the solid is less than or equal to 0.5 percent, or wherein the solid is free of secondary phases.

A polycrystalline solid should hereby be understood to mean a crystalline solid having crystallites, which are hereinafter also denoted as grains. The crystallites are separated from one another by grain boundaries. The solid thus contains grains which contain the material of the main phase or consist thereof. The solid is in particular sintered.

The solid has a main phase of the general formula:

$$(1-y)Pb_a(Mg_bNb_c)O_{3-e} + yPb_aTi_dO_3,$$

the system being a single-phase system. The lead magnesium niobate component, $Pb_a(Mg_bNb_c)O_{3-e}$, and the lead titanate component, $Pb_aTi_dO_3$, thus together form a solid solution, i.e. a single phase, this being the main phase of the polycrystalline, ceramic solid. The main phase is distinguished by a perovskite structure.

The polycrystalline, ceramic solid may have one or more further phases different from the main phase, which are hereinafter denoted as secondary phases. It is a central feature that the solid has only a small proportion of secondary phases or is entirely free of secondary phases. Thus, in any given section through the solid, the proportion of all the secondary phases added together, relative to the cross-sectional area through the solid, is less than or equal to 0.5 percent.

It is preferable for the solid to be free of secondary phases. In this case, the solid contains just the main phase and no secondary phase. The solid may in particular consist of the main phase.

A secondary phase is in principle understood to mean any independent phase which differs in composition from the main phase. Without being limited to the theory, the secondary phase may be an Mg-rich composition different from the composition of the main phase, such as for instance an $Mg_{2/3}Nb_{1/3}O_3$ phase. An Mg-rich secondary phase has an elevated Mg content in contrast to the main phase. For example, the Mg-rich secondary phase may at the same time be low in Pb, i.e. have a lower content of Pb than the main phase.

A secondary phase may for example also be a Pb-rich secondary phase, i.e. a secondary phase which has an elevated Pb content compared with the main phase.

Since secondary phases differ in their elemental composition from the main phase, it is possible to quantify the area fraction of the secondary areas in relation to a cross-sectional area through the solid by means of element distribution images. Such element distribution images may be obtained using SEM-EDX measurements (SEM denotes scanning electron microscopy; EDX denotes energy-dispersive X-ray spectroscopy).

The polycrystalline, ceramic solid is distinguished by high mechanical stability. Components such as for instance electrodes formed from this material are therefore robust and resistant.

Moreover, solids have a high breakdown voltage. This is important for safe application as an electrode material.

The solid is suitable for use as an electrode material not least because of its high dielectric constant and capacitance.

The described composition of the main phase enables an unexpectedly high capacitance in a temperature range of between 20 and 45° C., in particular between 30 and 42° C. A high capacitance in this range is particularly favorable for use in a series of ceramic electrodes. The capacitance maximum may for example be variably adjusted by the proportion of lead titanate, y, in the formula:

$$(1-y)Pb_a(Mg_bNb_c)O_{3-e} + yPb_aTiO_3.$$

By selecting y to be in the range $0.055 \leq y \leq 0.065$, ceramic solids may be obtained which achieve maximum electrical capacitance in the mammalian body temperature range.

The inventors have identified that, with the assistance of the y content, the capacitance can be adapted to the respective temperature at which the electrodes are operated. It is thus possible to establish a maximum capacitance for the respectively desired operating temperature.

Solids with $0.055 \leq y \leq 0.065$ are suitable for electrodes which are operated in a temperature range of between 20 and 45° C. A y content of between 0.055 and 0.065 is particularly advantageous in particular in the temperature range of between 30 and 42° C., for example at a temperature of 35 and 40° C. (for example 37° C.). Electrodes based on a solid of this composition do not merely have a very high capacitance in the stated temperature range but also at the same time a very low loss factor and low self-heating.

The polycrystalline, ceramic solid differs from conventional ceramic solids additionally in that it has no or only a very small proportion of secondary phases. The inventors have observed that in conventionally produced ceramic solids containing a main phase of a comparable chemical composition a significant proportion of secondary phases is present.

It has furthermore been identified by the inventors in experiments that these secondary phases reduce the electrical capacitance of the solid. However, a high capacitance is desirable specifically when used in electrodes.

Moreover, the inventors were able to observe experimentally that the secondary phases present in conventional ceramic solids lead to worse power loss when used in high capacitance ceramic electrodes. This leads to higher energy losses and thus to lower efficiency.

The higher electrical losses and discharge thereof in the form of heat additionally lead to self-heating of the solid. Such self-heating is undesirable. It is the result of energy losses in the form of waste heat and points to low efficiency. Furthermore, self-heating is also undesirable since the heat in the surroundings of the electrode may cause damage or may be experienced as unpleasant in the case of contact.

By establishing a secondary phase proportion of less than or equal to 0.5 percent (proportion relative to any given cross-sectional area through the solid), the inventors have succeeded in increasing dielectric constant and electrical capacitance. It was also possible to achieve improved power losses, which improves efficiency when used in ceramic electrodes and reduces undesired self-heating.

These positive effects are all the more pronounced, the smaller the proportion of secondary phases in the solid.

Furthermore, the inventors were able to observe that, by avoiding a significant proportion of secondary phases, the visual appearance of the ceramic solid may also be modified. Conventional ceramic solids of related composition are, for instance, often distinguished by a yellowish color shade. In contrast thereto, the ceramic solid does not exhibit any comparable yellow color shade.

The smaller the proportion of secondary phases in the solid, the smaller the yellowish color fraction. The yellowish color shade thus reflects the presence of secondary phases. The ceramic solid is distinguished, in contrast, by a slightly beige color shade.

According to one embodiment of the polycrystalline, ceramic solid, in each section through the solid the proportion of secondary phases relative to any given cross-sectional area through the solid is less than or equal to 0.3 percent, preferably less than or equal to 0.1 percent, more preferably less than or equal to 0.05 percent, particularly preferably less than or equal to 0.01 percent. It is most preferable for the polycrystalline, ceramic solid to be free of secondary phases.

The smaller the proportion of secondary phases in the solid, the higher the dielectric constant and the electrical capacitance and the lower the power losses. Consequently, a lower proportion of secondary phases also leads to lower self-heating. Moreover, as the proportion of secondary phases reduces, so the yellowish color shade of the ceramic solid diminishes.

According to one embodiment, the solid is free of pyrochlores, such as for example the stable cubic pyrochlore phase $Pb_3Nb_4O_{13}$. Pyrochlore phases occur in particular when free $Nb_2O_5$ is present during sintering or if a PbO deficiency prevails.

According to one embodiment, the solid does not comprise an Mg- and/or Nb-rich secondary phase, in particular no Mg-rich secondary phase. For example, without being limited to the theory with regard to the precise formula, the solid does not contain an $Mg_{2/3}Nb_{1/3}O_3$ phase. Such secondary phases may above all arise during sintering in the case of a Pb deficiency, which may inter alia occur during sintering due to release of gaseous PbO.

According to one further embodiment, the solid does not comprise a Pb-rich secondary phase. The inventors have identified that not only a deficit, but also an excess of Pb may lead to the formation of undesired secondary phases. Like the other above-described secondary phases, Pb-rich secondary phases also lead to a reduction in electrical capacitance.

One embodiment relates to the solid, wherein $0.057 \leq y \leq 0.063$, for example y is equal to 0.06.

One further embodiment relates to the solid, wherein the following applies for the coefficient a:
$0.96 \leq a \leq 1.02$, preferably $0.97 \leq a \leq 1.01$, more preferably $0.97 \leq a \leq 1.00$, and most preferably a=1.

One embodiment relates to the solid, wherein the following applies for the coefficient b: $0.31 \leq b \leq 0.36$. Preferably the following applies to b: $0.33 \leq b \leq 0.35$.

One embodiment relates to the solid, wherein the following applies for the coefficient c: $0.63 \leq c \leq 0.68$. Preferably the following applies to c: $0.64 \leq c \leq 0.66$. If c is less than 0.68, in particular less than 0.66, the ceramic solid does not have an elevated Nb content, and it may even be slightly reduced, which has a favorable effect on the avoidance of pyrochlore phases.

One further embodiment relates to the solid, wherein the following applies for the coefficient d: $0.95 \leq d \leq 1.05$, preferably d=1.0.

One embodiment relates to the ceramic solid, wherein the following applies for e: $0 \leq e \leq 0.09$. Preferably e is equal to 0. In this case the following general formula applies for the composition of the main phase:

$$(1-y)Pb_a(Mg_bNb_c)O_3 + yPb_aTi_dO_3.$$

Depending on the valences, for example of niobium, in the first component, it may happen that the oxygen content of the component $(1-y)Pb_a(Mg_bNb_c)O_3$ deviates slightly from the value 3 towards values of less than 3. This deviation preferably amounts to less than 0.09. As a rule there is no appreciable deviation and e is equal to 0.

One further embodiment relates to the solid, wherein the main phase comprises grains or consists of grains, the average $d_{50}$ grain size of which, measured as a number-related median value using static image analysis, is greater than 4.0 μm, preferably greater than 4.5 μm, particularly preferably greater than 5.0 μm.

The average $d_{50}$ grain size, measured as a number-related median value using static image analysis, for example lies in a range between 4.0 and 9 μm, preferably between 4.5 and 8 μm, more preferably between 5.0 and 7 μm, particularly preferably between 5.0 and 6.0 μm.

The individual grains are preferably determined in the static image analysis via an average diameter on the basis of the "equal circle diameter (ECD)". The grains or crystallites of a polycrystalline solid have an irregular three-dimensional structure. Using an EDX/EBSD analysis in scanning-electron microscopy, a 2D projection of the grains may be obtained (EDX/EBSD overlay image). In this way, the grain size may be expressed via the size of the area of the 2D projection of the grain. The ECD may ultimately be determined from the latter area. To this end, the diameter of a circle is calculated, the area of which corresponds to the measured 2D projection of the grain. In this application, average grain sizes are consequently determined via the area average.

Relatively large average grain diameters cause relatively large "domains" in the solid, i.e. regions within which electrical dipoles have the same orientation, which in turn results in the formation of relatively large dipole moments and thus a higher dielectric constant c for the solid. This is a cooperative effect, which overall brings about an increase in the electrical capacitance of the polycrystalline, ceramic solid. The larger is the average grain size, the higher is consequently the electrical capacitance.

The inventors have identified that by using a procedure which avoids secondary phases, at the same time polycrystalline, ceramic solids with relatively large average $d_{50}$ grain sizes, measured as a number-related median value using static image analysis, are obtained. The avoidance of secondary phases and the generation of relatively large grains are thus related to one another and make it possible to improve the electrical characteristics of the ceramic solid.

According to one embodiment, the solid has pores. Preferably, however, solids as a whole have a low porosity and consequently tend towards no significant absorption of moisture which might have an undesirable influence on the electrical characteristics. The pore volume may for example be less than 10%, preferably less than 5%, particularly preferably less than 2% relative to the total volume of the solid. It is also conceivable for the solid to be free of pores. The low tendency towards moisture absorption is reflected in the fact that, with an impedance measurement in saline solution, the open-circuit voltage (OCV) is obtained.

According to one embodiment, the solid has a compressed density of 4 to 5.5 g/ml, preferably 4.5 to 5.9 g/ml, for example 4.8 g/ml.

According to one embodiment, in the context of impedance measurements the ceramic solid has a DC resistance of greater than $10^8$ ohm.

According to one embodiment, the solid has a breakdown voltage in a liquid environment of greater than 4000 V. This enables safe application.

According to one embodiment, the ceramic solid has a capacitance of over 50 nF at 200 kHz and 1V in a temperature range of 30-42° C., in particular over 52 nF, for example 52-58 nF. According to one embodiment, the maximum capacitance of the ceramic solid amounts to at least 53 nF, for example 53-58 nF at 200 kHz and 1V in a temperature range of 30-42° C.

According to one embodiment, the solid does not have any cracks visible to the human eye. The composition exhibits good homogeneity and stability, such that cracking can be avoided.

A second aspect relates to an electrode comprising a polycrystalline, ceramic solid according to the first aspect and furthermore an electrical contact applied to the solid.

A ceramic solid provided with an electrical contact forms an electrode.

According to one embodiment, the electrode has precisely one ceramic solid and precisely one electrical contact.

According to one embodiment, the electrical contact comprises a noble metal, in particular silver, or consists of silver. Silver does not tend to corrode, even if exposed to high temperatures. In addition, it is solderable and easy to process.

According to one embodiment, the electrical contact is firmly connected to one side of the ceramic solid and can only be separated from the ceramic solid with a tractive power of greater than 35 N. In this way, an electrode with a contact is obtained which is particularly resistant to traction.

A third aspect relates to a method for producing a polycrystalline, ceramic solid comprising:
a main phase with a composition of the following general formula:

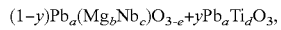
$(1-y)Pb_a(Mg_bNb_c)O_{3-e}+yPb_aTi_dO_3$, with $0.055 \le y \le 0.065$,
$0.95 \le a \le 1.02$,
$0.29 \le b \le 0.36$,
$0.63 \le c \le 0.69$,
$0.9 \le d \le 1.1$, and
$0 \le e \le 0.1$; and
and optionally one or more secondary phases,
wherein in each section through the solid, the proportion of secondary phases relative to any given cross-sectional area through the solid is less than or equal to 0.5 percent, or wherein the solid is free of secondary phases, comprising the method steps of:
A) providing starting materials comprising the elements Mg, Nb, Ti and Pb,
B) producing a mixture comprising the starting materials,
C) calcining the mixture to produce a calcined mixture,
E) processing the calcined mixture into a green body, and
F) sintering the green body,
wherein, to control the lead content,
step F) proceeds in a closed system, and/or
in step A) or another of the steps preceding step F) a Pb-containing starting material is added in excess.

The polycrystalline, ceramic solid produced using the method is in particular a solid according to the first aspect. All embodiments of the ceramic solid described as advantageous in this connection should also be considered to be further embodiments with regard to the method.

A closed system should be understood in particular to be a system, for example a container which may for instance take the form of a box, which does not allow any gas exchange with the surrounding environment.

The method makes it possible to prevent undesired secondary phases from arising by controlling the lead balance.

In contrast, with conventional methods uncontrolled loss of lead occurs during sintering. In particular, Pb may be outgassed in the form of PbO during sintering in a furnace. At high sintering temperatures Pb is thus removed from the green body, so leading locally to the formation of low-Pb or Mg-rich secondary phases. This is prevented in the method in that lead is added in excess prior to the sintering operation or in that sintering proceeds in a closed system, which efficiently prevents outgassing of PbO. In particular, the two measures may also be combined with one another, since even in a closed system an albeit limited quantity of PbO may transfer into the gaseous phase, even if saturation is established and it cannot leave the closed system. By combining a Pb excess and simultaneous sintering in a closed system, secondary phases may be particularly effectively reduced or entirely avoided. An initial Pb excess additionally supports the prevention of pyrochlore phases as secondary phases.

The inventors were able to establish that the method unexpectedly not only enables the prevention of secondary phases, but at the same time leads to larger grain sizes of the polycrystalline, ceramic solid. This, together with the avoidance of undesired secondary phases, enables an increase in the dielectric constant of the ceramic solid obtained. Moreover, improved capacitances and more favorable power losses are obtained, and an undesired yellowish color shade is avoided.

The starting materials provided in step A) may for example be oxides, hydroxides, carbonates, nitrates, acetates or comparable salts of the elements Mg, Nb, Ti and Pb. They are preferably oxides of the elements Mg, Nb, Ti and Pb and oxides of two or more of the elements Mg, Nb, Ti and Pb.

These compounds are generally commercially obtainable at acceptable prices or can be produced without major experimental effort.

According to one embodiment of the method, in step A) a first starting material is provided, this being an Mg- and Nb-containing starting material. The first starting material is preferably $Mg_{1/3}Nb_{2/3}O_2$. The use of $Mg_{1/3}Nb_{2/3}O_2$ as first starting material favors the avoidance of undesired pyrochlore phases, such as $Pb_3Nb_4O_{13}$, as secondary phases. If $Mg_{1/3}Nb_{2/3}O_2$ is selected as the first starting material, the method may also be described as a method according to the columbite method.

According to one embodiment of the method, step A) is preceded by a separate step A0) for producing $Mg_{1/3}Nb_{2/3}O_2$. $Mg_{1/3}Nb_{2/3}O_2$ may be produced for example from magnesium oxide (MgO) and niobium oxide ($Nb_2O_5$), for example by wet grinding, subsequent drying (filter press, spray drying), subsequent calcining and optionally a final grinding step.

According to one embodiment of the method, in step A) a second starting material is provided, this being a Ti-containing starting material. $TiO_2$ preferably serves as a second starting material. $TiO_2$ is comparatively inexpensive and readily obtainable.

According to one further embodiment of the method, in step A) a third starting material is provided, this being a Pb-containing starting material. In particular, the Pb oxides PbO and $Pb_3O_4$ have proven very suitable. They allow good reaction control and support lead balance control.

According to one embodiment, the third starting material is $Pb_3O_4$. $Pb_3O_4$ decomposes at temperatures from around 500° C. and in the process releases PbO. $Pb_3O_4$ has a lower toxicity than PbO, such that use thereof improves occupational safety. Selecting $Pb_3O_4$ instead of PbO enables safer filling of reaction vessels and reactors. This is of particular significance for large-scale industrial manufacture of the ceramic solid.

According to one embodiment, the starting materials in step A) are provided in stoichiometric proportions to one another. In this case, step F) proceeds in a closed system, in order to prevent loss of Pb during sintering through outgassing of PbO.

According to one further embodiment, in step A) all non-Pb-containing starting materials are provided in stoichiometric proportions to one another, while the Pb-containing starting material is added in excess. The inventors have identified that a Pb excess in step A) allows low-Pb or Mg- and/or Nb-rich secondary phases to be avoided.

According to one preferred embodiment, the excess of the Pb-containing starting material (or of the third starting material) is selected such that the Pb content of all the starting materials provided amounts to up to 0.02 mol per 1 mol Pb of the composition of the main component, $(1-y)Pb_a(Mg_bNb_c)O_{3-e}+yPb_aTi_dO_3$, to be achieved.

The stated excess preferably amounts to between 0.01 mol and 0.02 mol. The inventors have observed that, in the latter case, both low-Pb and Pb-rich secondary phases can be particularly well avoided.

According to a further development, the Pb-containing starting material is PbO. In this case, the starting materials are provided in such a quantity that their stoichiometry relative to one another would theoretically result in a composition after a reaction without Pb losses of the following general formula:

$$(1-y)Pb_a(Mg_bNb_c)O_{3-e}+yPb_aTi_dO_3+xPbO,$$

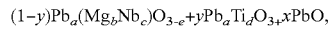

wherein a to e are defined as stated above and wherein $0 \leq x \leq 0.02$. Preferably $0 < x \leq 0.02$, more preferably $0.01 \leq x \leq 0.02$. PbO is thus added in an excess of up to 0.02 mol, such that the composition has up to 0.02 mol excess Pb per 1 mol of Pb desired in the main phase.

Likewise, $Pb_3O_4$ may be added in excess instead of PbO. If the Pb-containing starting material is $Pb_3O_4$, $Pb_3O_4$ is added in an excess of up to 0.0067 mol per 1 mol Pb of the composition to be achieved of the major component. Since 1 mol of $Pb_3O_4$ releases 3 mol of PbO, this in turn corresponds to a Pb excess of up to 0.02 mol. $Pb_3O_4$ is preferably added in an excess of between 0.0033 mol and 0.0067 mol. This proportion of the starting material $Pb_3O_4$ is particularly suitable for avoiding secondary phases and achieving good grain sizes.

According to one embodiment, production of a mixture proceeds in method step B) through grinding of the starting materials, in particular wet grinding. In the case of wet grinding, comminution of the starting materials takes place in a suspension, for example an aqueous suspension.

Grinding is continued until the starting materials comprise powder or suspensions with d50 grain sizes, measured as a number-related median value using static image analysis, of <1.5 μm, preferably <1 μm.

Mixtures with grain sizes of the stated type lead to good results in the event of further processing. They provide good intermixing and in this way make it easier to achieve good homogeneity during calcination.

According to one embodiment of the method, wet grinding is followed by a drying step B1). The drying step serves in preparation for calcification.

According to one embodiment, the calcining step C) proceeds at a temperature of between 800 and 860° C., for example at 840° C. These temperatures ensure effective moisture removal.

According to a further development of the just mentioned embodiment, the calcining step C) does not proceed in a closed system, such as for instance a closed container, according to step F). This is unnecessary, since the stated temperatures are not sufficiently high to cause significant PbO loss. It is however also in principle possible to perform the calcining step likewise in a closed system.

According to one embodiment, the method comprises a step D) in which $TiO_2$ and/or $Nb_2O_5$ is added to the calcined mixture. Step D) preferably takes place after step C) and before step F).

The addition of $TiO_2$ and/or $Nb_2O_5$ makes it possible to shift or adjust the electrical capacitance maximum of the ceramic solid as a function of temperature.

Moreover, the addition of $TiO_2$ and/or $Nb_2O_5$ in step D) allows excess lead, for instance in the form of PbO, to be consumed within the calcined mixture through the formation of perovskite phases. The addition of $TiO_2$ and/or $Nb_2O_5$ in method step D) thus constitutes a further means for controlling the lead balance. For example, the combination of an initial Pb excess, which is favorable to the avoidance of pyrochlore phases, makes it possible, in combination with the addition of $TiO_2$ and/or $Nb_2O_5$ in step D), to reduce the initial Pb excess and so avoid the risk of an excess of Pb in the finished solid. The latter leads to a decrease in dielectric constant or capacitance.

According to one embodiment, the proportion of added $TiO_2$ and/or $Nb_2O_5$ relative to the calcined mixture amounts to up to 0.4 weight percent, preferably 0.001 to 0.4 weight per cent, more preferably 0.01 to 0.4 weight percent, particularly preferably 0.1 to 0.4 weight percent relative to the weight of the calcined mixture.

One embodiment relates to the method, wherein in step A) a Pb-containing starting material is added in excess and wherein the method at the same time comprises a step D) after step C), in which $TiO_2$ and/or $Nb_2O_5$ is added to the calcined mixture. In addition, it is preferable for step F) to proceed at the same time in a closed system. Instead of evaporating excess lead, it is for example possible to add $TiO_2$ and/or $Nb_2O_5$ in a step D) which binds the excess lead. This has the advantage over the evaporation of excess PbO in the sintering step that the resultant polycrystalline, ceramic solid as a whole is markedly more homogeneous. The diffusion rate of lead in the solid is less by several orders of magnitude than in the gaseous phase. This leads to excess, near-surface PbO leaving the solid more quickly during sintering than PbO can diffuse from the interior of the solid. In particular, if the sintering does not take place in a closed system, particularly large quantities of PbO are evaporated. Due to the differences in rate of diffusion, this leads to local inhomogeneities in the solid, which in turn promotes the formation of undesired secondary phases. It is thus particularly advantageous for excess Pb, which was added for example in step A) in the form of an excess of the Pb-containing starting material (third starting material), to be compensated by the addition of $TiO_2$ and/or $Nb_2O_5$ in step D), wherein at the same time sintering proceeds in a closed system.

One embodiment relates to the method, wherein step E) comprises:
grinding the calcined mixture,
adding a binder to the calcined mixture,
spray drying the calcined mixture with binder to produce ceramic pellets, and
compression-molding the ceramic pellets to produce the green body.

Grinding of the calcined mixture is here preferably continued until the obtained d50 grain size, measured as a number-related median value using static image analysis, amounts to <2 µm, preferably <1 µm, e.g., around 0.8 µm. Grinding is optionally performed jointly in step E) with the calcined mixture $TiO_2$ and/or $Nb_2O_5$, which was added in an optionally performed step D). Fine grinding encourages the obtainment of a homogeneous green body.

The proportion of the binder relative to the weight of the calcined mixture preferably amounts to between 0.5 and 10 weight percent, more preferably to between 1 and 5 weight percent, in particular between 2 and 4 weight percent, for example 3 weight percent. The binder may for example be a PVA binder (PVA=polyvinyl alcohol).

Through spray drying of the calcined mixture with binder, ceramic pellets are obtained, from which a green body may be produced by compression-molding.

As a result of the sintering according to step F), the green body develops into the ceramic solid, in accordance with the first aspect.

According to one embodiment of the method, step F) is performed at a maximum temperature of 1150 to 1280° C. The method may, for example, be performed at a maximum temperature of 1250° C.

According to one embodiment, the maximum temperature during step F) is maintained for 1 to 6 hours, for example for 4 hours.

These temperatures and maintenance times during sintering allow not only complete reaction of the starting materials but also good homogeneity of the resultant ceramic solid, which supports the avoidance of undesired secondary phases.

According to one embodiment of the method, step F) proceeds in a closed system, wherein the closed system is a closed container.

A closed container should in particular be understood to mean a container between the interior of which and the surrounding environment no gas exchange takes place.

According to one embodiment, the container has a height of 10-40 cm, for example 15-25 cm, a width of 20-50 cm, for example 25-35 cm and a depth of 30-50 cm, for example 35-45 cm.

According to one embodiment, the closed container comprises at least one of the materials selected from the group of $Al_2O_3$, $ZrO_2$ and MgO or the container consists of one of these materials.

The closed container preferably comprises MgO or consists thereof. The inventors have found that MgO is particularly suitable, since it has an unusually high level of tightness relative to PbO and also does not tend to absorb PbO. For example, MgO allows a better seal to be achieved relative to PbO than is possible with conventional container materials, such as for instance cordierite or mullite. In particular, in contrast to other metal oxides MgO also does not have a tendency to absorb PbO. In this way, better shielding may be achieved than in the case of conventional container materials, such that outgassing of PbO can be better prevented than with other materials, such as for example with cordierite or mullite as container material.

According to one embodiment, the closed container has a container body and a container plate, which preferably contain the just-mentioned materials or consist thereof.

According to one embodiment, a plurality of green bodies are simultaneously sintered in the closed container. For example, a plurality of stacks of green bodies may be simultaneously sintered in the closed container. For example, 5 to 25 stacks each of 5 to 30 green bodies may be sintered in the container. In this way, as a result of the presence of a plurality of green bodies, PbO saturation may be more rapidly reached in the closed container, whereby an excessively high, undesirable lead loss can be avoided.

One preferred embodiment relates to the method, wherein the closed container has an interior in which one or more green bodies are arranged, such that the degree of filling by volume of all the green bodies relative to the volume of the interior amounts to at least 30 vol. %, preferably at least 40 vol. %.

The degree of filling by volume indicates the ratio of the total volume of all the green bodies which are arranged and sintered in the interior of the closed container, relative to the total volume of the interior of the closed container.

$$\text{Deg. filling by vol.} = \frac{\text{Volume of all green bodies}}{\text{Volume of container interior}} \cdot 100 \ [\text{vol. \%}].$$

If only one green body is present in the closed container, "volume of all the green bodies" is equal to the volume of this individual green body. If a plurality of green bodies are present in the closed container, the "volume of all the green bodies" is equal to the sum of the individual volumes of the green bodies arranged in the interior of the closed container.

A degree of filling by volume of 0 vol. % would mean that the closed container is empty, i.e. does not contain any green bodies. A degree of filling by volume of 100 vol. % would mean that the container is completely filled with the green body or green bodies, wherein no interspaces would remain.

The inventors have observed that a degree of filling by volume of at least 30 vol. % is particularly suitable for keeping Pb losses low during sintering. With a degree of filling by volume of at least 30 vol., PbO saturation in the interior of the closed container can quickly rapidly be reached. This makes it more difficult for further PbO to pass into the gaseous phase. This makes it possible for a preferably present Pb excess in the green body to be slowly and controllably reduced during sintering. A Pb deficit in the resultant ceramic solid can be reduced or wholly avoided in this way, which assists in the avoidance of undesired secondary phases.

The lower the degree of filling by volume of the container, the more PbO passes into the gaseous phase in the interior of the closed container and the more difficult becomes control of the lead balance.

A degree of filling by volume of at least 40 vol. % is still more suitable. This enables particularly efficient control of the lead balance.

According to one further embodiment, the degree of filling by volume amounts to less than 60 vol. %. The inventors have identified that it is favorable for the degree of filling by volume not to exceed 60 vol. %. If the degree of filling by volume is higher, it is difficult to arrange the green bodies in the closed container in such a way that they are sufficiently separate from one another to be jointly sintered.

According to a particularly preferred embodiment, the degree of filling by volume amounts to between 30 and 60 vol. %, preferably between 40 and 60 vol. %. In this case, neither a significant Pb excess nor a major Pb deficit arises in the resultant ceramic solid, the consequence of which is that Pb-rich and low-Pb secondary phases can be avoided.

The inventors were for example able to observe that a degree of filling by volume of 45 vol. % of green bodies in a container comprising MgO leads to a green body weight loss of merely around 0.6 weight percent as a result of evaporation of PbO. Such a low lead loss allows excellent lead balance control and thus effective avoidance of undesired secondary phases.

According to one embodiment, the degree of filling by volume amounts to at least 30 vol. % and at the same time the first starting material is $Mg_{1/3}Nb_{2/3}O_2$ and the Pb-containing starting material is $Pb_3O_4$, wherein the ratio of the molar quantities of $Mg_{1/3}Nb_{2/3}O_2$ and $Pb_3O_4$ amounts to 1:0.34 to 1:0.38, preferably 1:0.35 to 1:0.37, more preferably 1:0.355 to 1:0.36, for example 1:0.356 to 1:0.358. These parameters allow excellent lead balance control while complying with stringent safety requirements, and the obtainment of a ceramic solid which is free of secondary phases and allows excellent values with regard to capacitance and power loss. Furthermore, in this case the Ti-containing starting material may for example be $TiO_2$ and the ratio of the molar quantities of $Mg_{1/3}Nb_{2/3}O_2$ and the Ti-containing starting material may for example be 1:0.055 to 1:0.065.

According to one embodiment, sintering proceeds in a furnace in which the closed container is arranged. One further important effect of the method is that, by using a closed container in step F), the furnace used for sintering is protected from gaseous PbO. Gaseous Pb leads to the inner lining of the furnace absorbing a considerable quantity of Pb over time. This leads to damage to the materials used for the inner lining. Since these often contain silicates or aluminosilicates, they have a tendency to "vitrify" on absorption of lead. However, other types of inner furnace lining may also be damaged by Pb absorption. The inner lining becomes brittle and cracked over time due to the absorption of lead, and has to be renewed. The inventors have recognized that this can be particularly effectively prevented by sintering in a closed container preferably comprising or consisting of the above-stated materials.

A fifth aspect relates to a method for producing an electrode according to the second aspect, comprising a method for producing a polycrystalline, ceramic solid according to the fourth aspect and comprising a subsequent step for providing the solid with an electrical contact.

According to one embodiment, the electrical contact is obtained by applying and stoving a paste, wherein stoving is preferably performed at a temperature of 680 to 760° C. The paste is preferably a silver paste. Silver is corrosion-resistant even at high temperatures, solderable and allows a firm connection with the polycrystalline, ceramic solid.

The methods according to the fourth and fifth aspects will be explained further below with reference to an exemplary synthetic route.

The stoichiometry of the starting materials to be provided is selected such that they correspond in quantity to the following formulation:

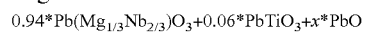

$$0.94*Pb(Mg_{1/3}Nb_{2/3})O_3 + 0.06*PbTiO_3 + x*PbO$$

with $0 \leq x \leq 0.02$.

The weighed-out PbO excess of up to 0.02 mol per 1 mol Pb of the composition of the main phase ultimately reduces over the course of the sintering process.

Production proceeds on the basis of an Mg- and Nb-containing starting material, such as for instance $Mg_{1/3}Nb_{2/3}O_3$, for example according to the "columbite" method. The Mg- and Nb-containing starting material is in this case wet-ground with a Pb-containing starting material, for example $Pb_3O_4$, and a Ti-containing starting material, for example $TiO_2$, (d50 grain size<1 μm), dried and calcined at a temperature of between 800 and 860° C. The Pb-containing starting material is to this end preferably provided in excess. The finished working powder is optionally finely ground jointly with (additional) $TiO_2$ or $Nb_2O_5$ (0 to 0.4 weight percent based on the weight of the working powder) and mixed with a binder, for example PVA binder. Then the obtained mixture is spray-dried, such that compression-moldable ceramic pellets arise. The pellets are compression-molded into green bodies and sintered. Sintering takes place at 1150-1280° C., wherein the sintering temperature is maintained for 1-6 hours. To control the lead balance, sintering is performed in a closed container for instance in the form of a box of MgO with a degree of filling by volume of >30 vol. %.

The container may in particular have a container body and a container plate. Container body and container plate combined together form the container. They are arranged on one another such that the container is closed.

This method may be simply extended for the purposes of mass production, by using correspondingly large containers or a plurality of containers in the sintering furnace. The method yields polycrystalline, ceramic solids which are free of secondary phases.

In the course of compression-molding the geometry of the polycrystalline, ceramic solid may be formed. The electrical contact is obtained by metallization. A silver paste is preferably used for this purpose, in order to achieve electrical contacts comprising or consisting of Ag. The paste is stoved at a temperature of between 680 and 760° C. and is solderable.

BRIEF DESCRIPTION OF THE DRAWINGS

The invention is explained further below with reference to figures. In this case, a conventional polycrystalline, ceramic solid (reference) is compared with a polycrystalline, ceramic solid (specimen) according to embodiments:

FIGS. 2A and 2B show scanning electron micrographs (SE micrographs) of a conventional solid (FIG. 2A) and one according to embodiments (FIG. 2B).

FIGS. 3A and 3B show element distribution images for the element magnesium of a conventional ceramic solid (FIG. 3A) and one according to embodiments (FIG. 3B).

FIGS. 4A and 4B show tables with EDX results for the elemental composition of the main phase (FIG. 4A) and the secondary phase (FIG. 4B) of a conventional ceramic solid.

FIG. 5 shows results for elemental composition (EDX results) of the main phase of the ceramic solid according to embodiments.

FIGS. 7A and 7B show the results of the evaluation of the grain sizes for a conventional solid (FIG. 7A) and the solid according to embodiments (FIG. 7B).

DETAILED DESCRIPTION OF ILLUSTRATIVE EMBODIMENTS

The figures and results are described in detail below:

FIGS. 1A to 2B are in each case scanning electron micrographs. These and the further electron micrographs and measurement results described hereinafter were obtained using a Zeiss Merlin Compact VP scanning electron microscope. All four micrographs were captured at 1000 times magnification with an acceleration voltage of 20 kV in a vacuum of in each case around $2.2*10^{-6}$ mbar. The specimen and the reference are in each case polycrystalline, ceramic solids. Both specimen and reference were sawn up, embedded, sanded and polished for the scanning electron micrographs. To prevent charges, the polished section was vapor-coated with a thin carbon layer.

Figure 1B:
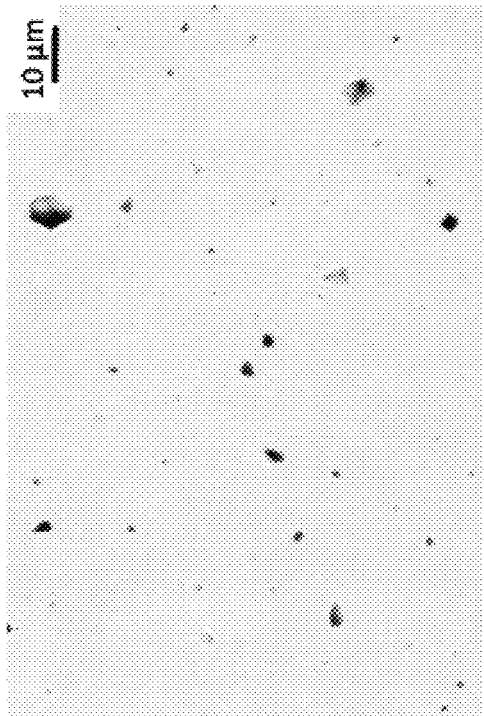
FIGS. 1A and 1B show scanning electron micrographs (BSE micrographs) of a conventional solid (FIG. 1A) and one according to embodiments (FIG. 1B).
Figure 1A:
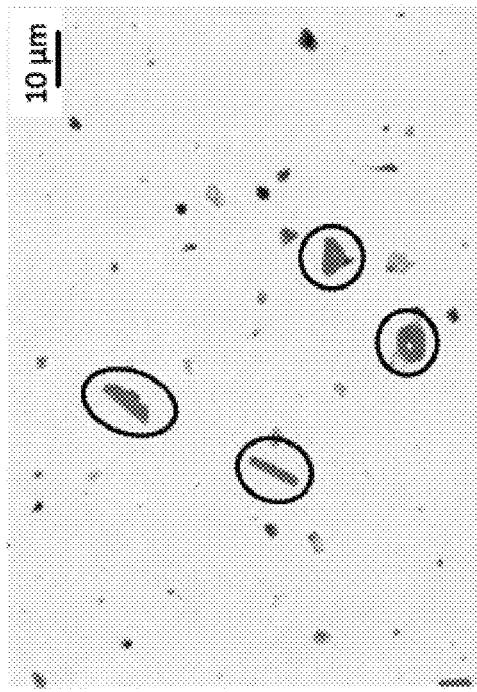

FIGS. 1A and 1B show backscattered electron (BSE) contrast images (BSE micrographs) for the reference (FIG. 1A) and the specimen (FIG. 1B). FIGS. 2A and 2B, on the other hand, show secondary electron (SE) contrast images (SE micrographs) for the reference (FIG. 2A) and the specimen (FIG. 2B). The BSE and SE micrographs of FIGS. 1A and 2A were each captured at the same point of the reference. Likewise, the BSE and SE micrographs of FIGS. 1B and 2B were captured at the same point of the specimen. BSE micrographs provide a good material contrast (phase contrast), while more topographical information can be obtained using SE micrographs. Dark spots are visible on the BSE micrographs of reference and specimen. These dark spots are predominantly attributable to pores, since both the specimen and the reference similarly have a degree of porosity, albeit slight overall. The light background, on the other hand, is in each case attributable to the main phase.

As already mentioned, SE micrographs allow conclusions to be drawn about the surface topography of the solid under investigation. The SE micrographs of FIGS. 2A and 2B also show the dark spots which are visible on the BSE micrographs, but the SE micrographs of the reference of FIG. 2A allow differentiation between two different types of dark spot, while FIG. 2B does not show different types of dark spot. FIG. 2A contains dark spots with light borders and dark spots without light borders. The dark spots with light borders are attributable to pores. The light borders are caused by the change in topography in the region of a pore. However, FIG. 2A also has dark areas without light borders, which are not attributable to pores but rather to secondary phases, as will be further explained below. Dark spots belonging to the secondary phase are each marked in FIG. 2A and also in FIG. 1A with the aid of circles. In contrast thereto, FIG. 2B only shows pores, but no secondary phases. The reference is distinguished by a considerable proportion of secondary phases, while the specimen according to embodiments does not have any secondary phases. The secondary phases marked in FIGS. 1A and 2A are distinguished by a partly acicular or angular structure. They have a different chemical composition from the otherwise light main phase, which forms the background to the micrographs. This is clear in particular with the aid of an investigation into the chemical composition of the main and secondary phases of the reference and the sole main phase of the specimen (FIGS. 3-5).

FIGS. 3A and 3B show element distribution images for the element magnesium for the reference (FIG. 3A) and the specimen (FIG. 3B), which were obtained using SEM-EDX measurements (EDX denotes energy-dispersive X-ray spectroscopy). For EDX measurements an Oxford SDD 80 mm² detector was used (Aztec). The images show the distribution of magnesium for the reference and the specimen manufactured by the method according to embodiments. The element distribution images in turn show the same spots which have already been depicted in FIGS. 1 and 2. Light spots indicate a high magnesium content. It is clear from a comparison of FIGS. 3A and 3B that the reference has Mg-rich spots. The secondary phase, which is present in the reference, is thus an Mg-rich secondary phase. Element distribution images also make it possible to quantify the proportion of the secondary phase in the polycrystalline, ceramic solid of the reference. An evaluation of Mg element distribution images of conventional, ceramic solids shows a high proportion of undesired secondary phases. For instance, the reference has a secondary phase which, for a section through the solid, on average shows a proportion of the secondary phase relative to a cross-sectional area through the solid of 0.7 percent. In contrast, the ceramic solid according to embodiments of FIG. 3B is free of Mg-rich spots. It does not have a secondary phase.

Further element distribution images were furthermore captured for the elements C, O, Ti, Nb and Pb for the reference and the specimen. What is noteworthy here is that the element distribution images for lead (Pb Ma1 micrographs) for the spots which belong to the Mg-rich secondary phase of the reference indicate lead depletion relative to the main phase. From the different element distribution images it is clear that the specimen is free of undesired secondary phases, while the reference has an Mg-rich and simultaneously low-Pb secondary phase. The most important results of the investigation of the elemental composition of the main phase of the specimen and reference and the secondary phase of the reference are brought together in the tables of FIGS. 4A, 4B and 5.

FIGS. 4A and 4B show the EDX results from comparative scanning electron microscopy for the reference, wherein FIG. 4A reproduces the EDX results of the main phase and FIG. 4B the EDX results of the secondary phase of the ceramic solid. FIG. 5 shows EDX results from comparative scanning electron microscopy for the specimen. Four EDX spectra are shown in each case. The measured proportions of the elements O, Mg, Ti, Nb and Pb are plotted in atom percent for each spectrum. The average value was formed in each case from the 4 spectra for the proportions of Mg, Ti, Nb and Pb. Experience shows that the proportion of light elements, such as oxygen, is underestimated in EDX measurements. Normalization for determining the empirical formula was therefore appropriately undertaken such that the total content of Mg+Ti+Nb corresponds in total to 1. The resultant coefficients of the associated chemical formula may likewise each be inferred from the tables. The coefficients respectively expected on the basis of weighed-out quantities have additionally been indicated for the main phase. A comparison of FIGS. 4A and 5 indicates that the lead content deviates less from the ideal composition in the case of the specimen according to embodiments. The lead content of the main phase of the reference is, at 0.941, markedly lower than the ideal value 1.0. In contrast, the main phase of the specimen comes markedly closer to the ideal value. Finally, conclusions may be drawn from FIG. 4B about the chemical composition of the secondary phase. As has already been mentioned above, the secondary phase is rich in Mg and low in Pb. The Nb content is slightly higher than in the main phase. Without being limited to the theory, the secondary phase appears to be most readily described by the formula $Mg_{2/3}Nb_{1/3}O_3$ phase.

Figure 6B:
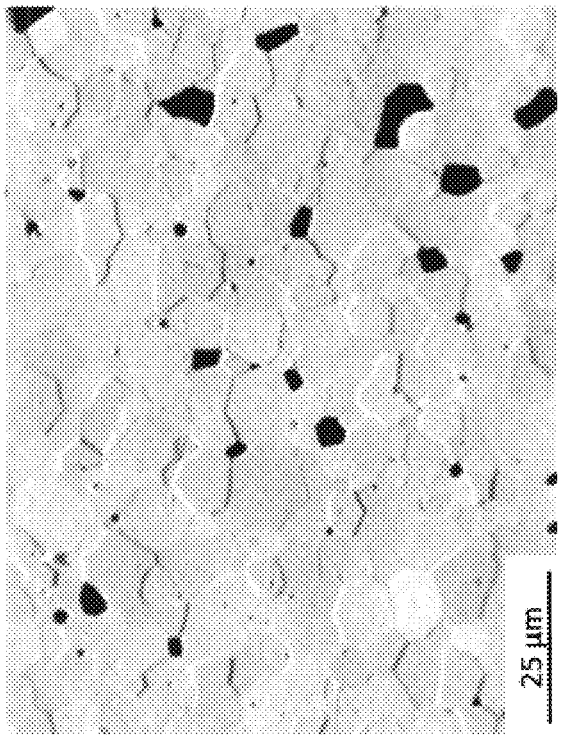
FIGS. 6A and 6B show EDX/EBSD overlay images (EBSD=electron backscatter diffraction) for a conventional solid (FIG. 6A) and the solid according to embodiments (FIG. 6B).
Figure 6A:
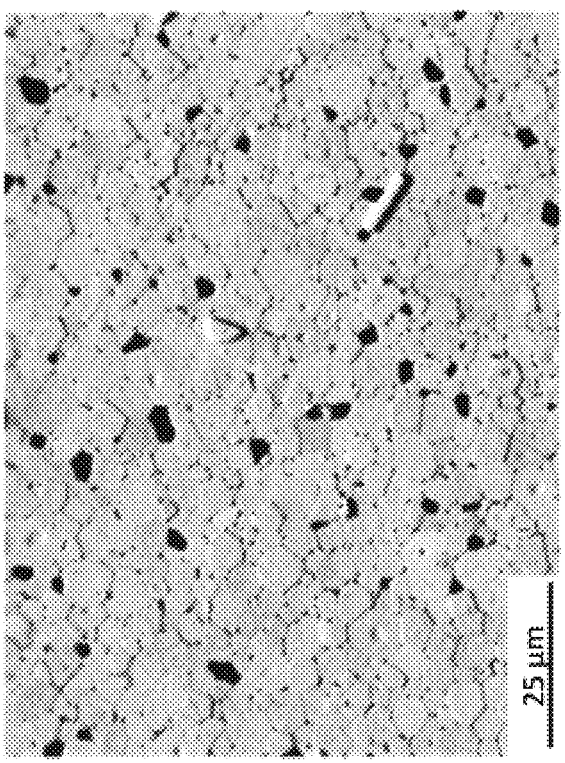

FIGS. 6A and 6B show EDX/EBSD overlay images (EBSD=electron backscatter diffraction) for the reference (FIG. 6A) and the specimen (FIG. 6B). A forward scatter detector (FSD) was used for the micrographs. The EBSD measurements were carried out on etched specimens. In this respect, the following settings were selected for the reference and specimen respectively: acceleration voltage 20.00 kV; specimen tilt (degrees) 69.99°; hit ratio 94.25% to 94.99%; capture speed 66.25 to 66.35 Hz. The phases for the micrographs were, based on the phase $Pb(Mg_{1/3}Nb_{2/3})O_3$: a=4.05 Å; b=4.05 Å; c=4.05 Å; α=90.00°; β=90.00°; γ=90.00°; space group 221; ICSD database. From the figures it is particularly easy to compare the grain sizes of the crystallites of the reference and of the specimen. The specimen is distinguished by distinctly larger grain sizes.

A quantitative evaluation of the differences in grain size is shown in FIGS. 7A and 7B. Determination of the equivalent circular diameter (ECD) has already been explained above. It is clear in particular from the figures that the specimen according to embodiments (FIG. 7B), at 5.32 μm, has a markedly larger $d_{50}$, measured as a number-related median value using static image analysis, than the reference, at 3.79 μm (FIG. 7A). The overall grain size distribution is thus shifted in the specimen to larger grain sizes compared to the reference specimen. This shows that the method according to embodiments, by means of which the specimen was manufactured, leads not only to the avoidance of secondary phases, but at the same time also to larger crystallites, whereby improved electrical capacitances (FIG. 8) and lower power losses (FIG. 9) are achieved.

Figure 8:
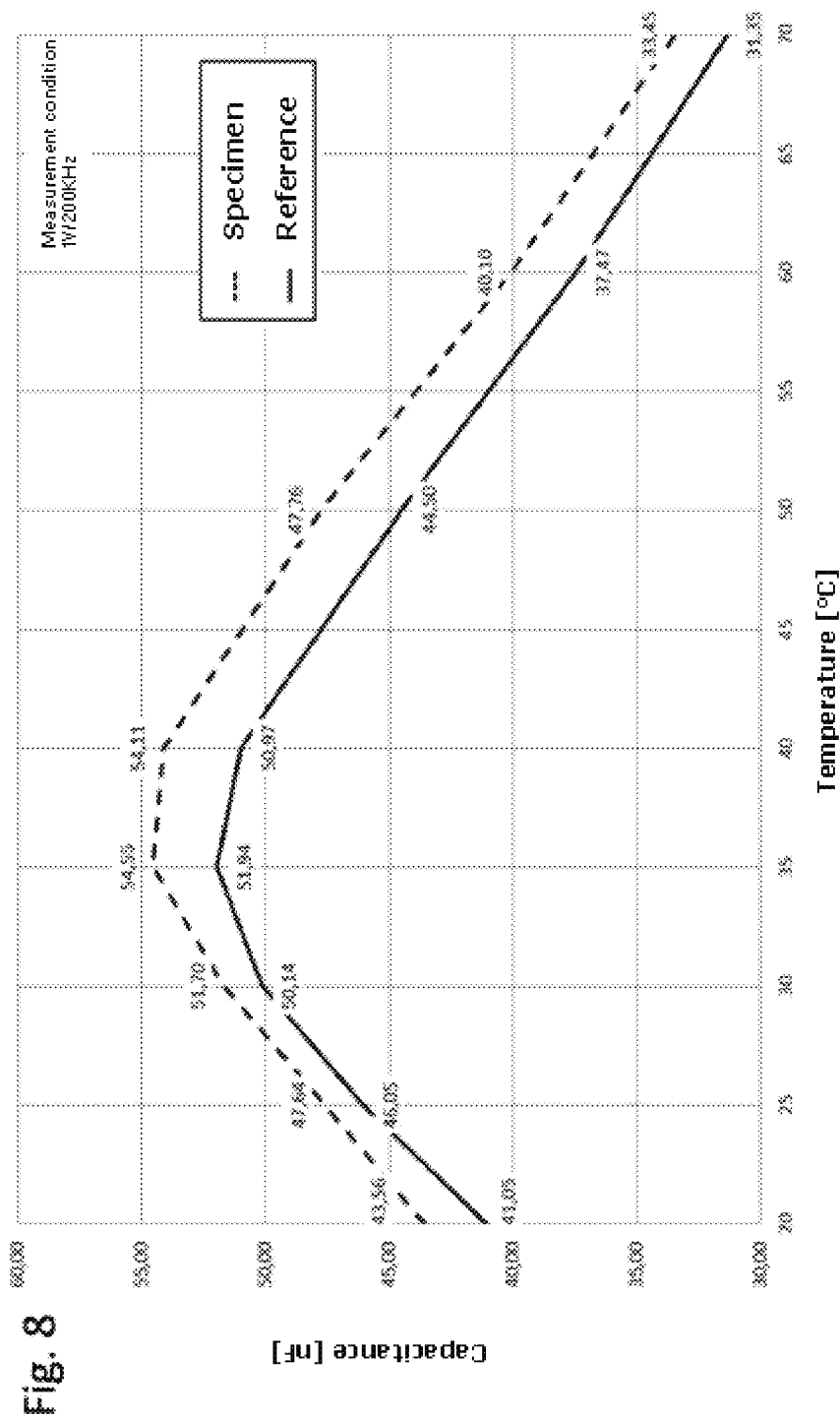
FIG. 8 shows electrical capacitance versus temperature for a polycrystalline ceramic solid according to embodiments and a conventional polycrystalline ceramic solid with secondary phases.

FIG. 8 compares the electrical capacitances of the specimen and the reference. The graph shows the dependency of the electrical capacitance, stated in nanofarads [nF], on the temperature in degree centigrade [° C.]. The measurements were each carried out at 200 kHz and 1V. Both solids have an electrical capacitance maximum in the temperature range of between 30 and 42° C. This is attributable to the comparable chemical composition of the main phase. From a comparison of the measurement curves obtained, it becomes clear that the electrical capacitance of the specimen is constantly markedly higher over the entire measured temperature range than the electrical capacitance of the reference. The capacitance is on average around 5% higher for the specimen according to embodiments.

Figure 9:
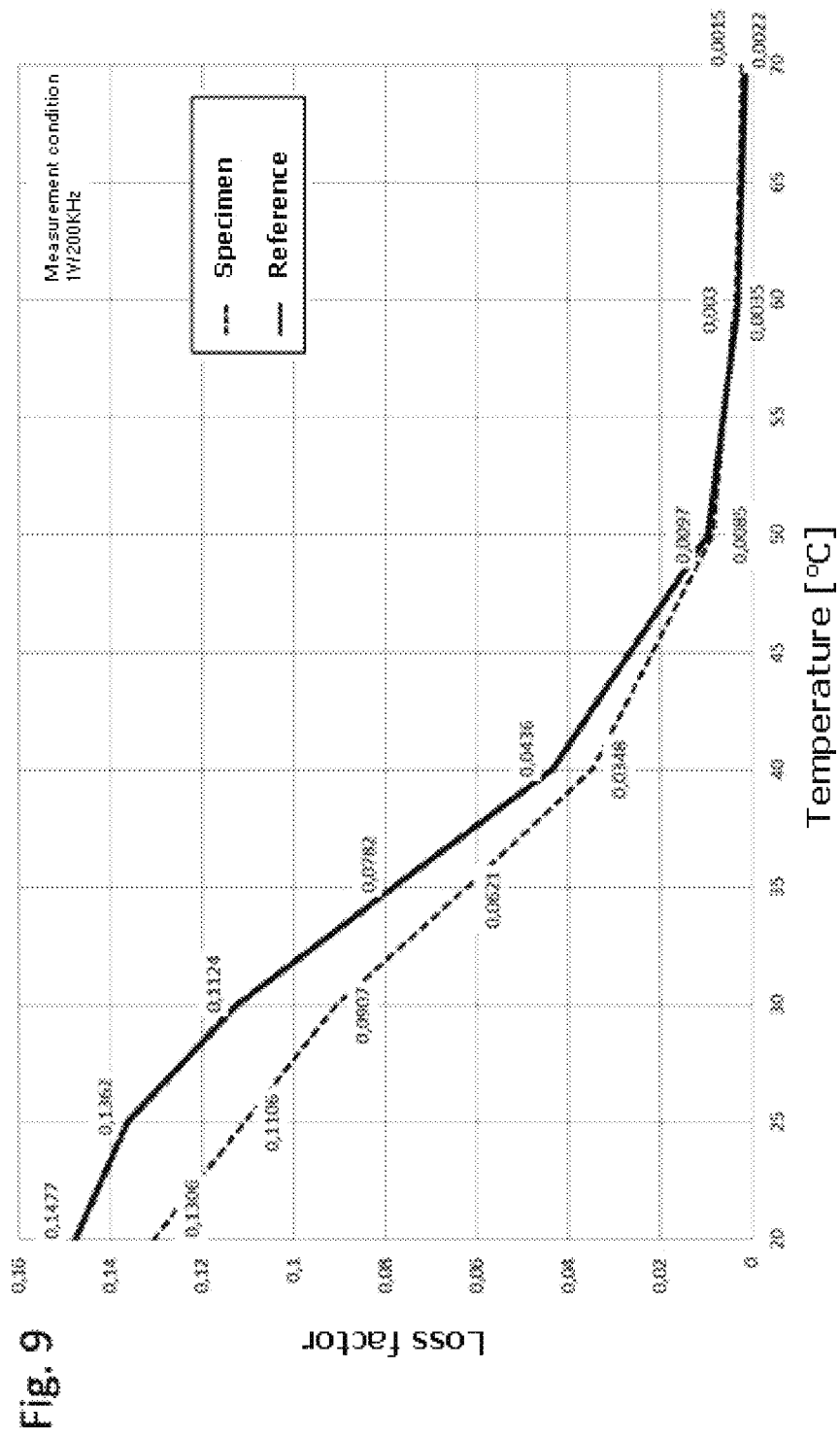
FIG. 9 shows the relationship between loss factor and temperature for a polycrystalline, ceramic solid according to embodiments and a conventional polycrystalline, ceramic solid with secondary phases.

FIG. 9 shows the dependency of the loss factor on the temperature in degree centigrade [° C.]. The measurements were each carried out at 200 kHz and 1V. For specimen and reference the loss factor drops as the temperature increases. In contrast to the reference, the loss factor for the important temperature range between 20 and 45° C. is markedly lower, however, which means that if the solid according to embodiments is used in electrodes, low power losses are obtained. This leads to greater efficiency and above all to lower self-heating.

Figure 10A:
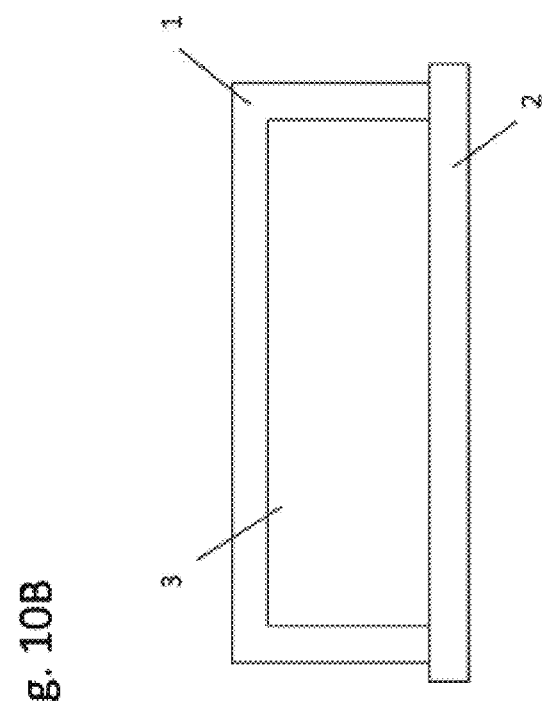
FIGS. 10A and 10B show a container with gap (FIG. 10A) and a completely closed container (FIG. 10B) as may be used to produce the specimen and to produce solids corresponding to the reference.
Figure 10B:
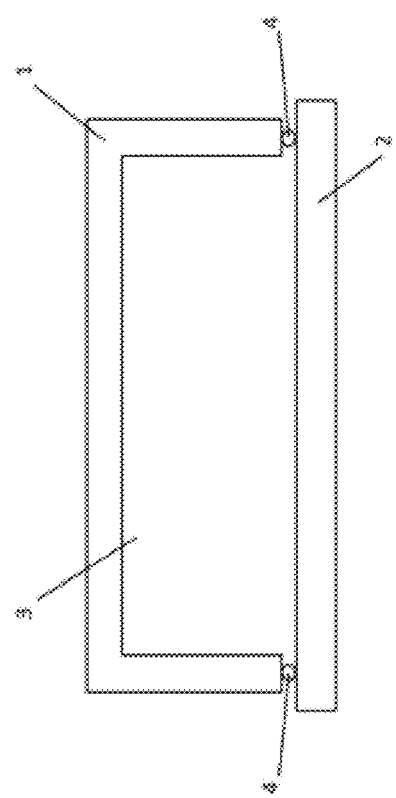

FIGS. 10A and 10B illustrate how the reference and the specimen, as described in FIGS. 1-9, may be obtained. The specimen is an inventive polycrystalline, ceramic solid according to the first aspect, obtained using the inventive method of the fourth aspect. In this case, the sintering step F) was carried out in a container according to FIG. 10B with a container body (1) and a container plate (2). Together these form a closed container, in the interior (3) of which the sintering step F) of the method according to embodiments is carried out. To this end, one or more green bodies are arranged in the interior (3) of the closed container. The closed container forms a closed system which prevents outgassing of PbO. The shape of the container may be varied. The material of the container is selected such that it is not suitable for absorbing PbO and is impermeable to PbO, so enabling particularly effective control of the lead balance during sintering. In contrast, conventional polycrystalline ceramic solids required for high capacitance electrodes for treating patients are not sintered with sufficient lead balance control. This leads to outgassing of PbO during sintering and thus to inhomogeneities in the solid. The inventors found in particular that this is responsible for the formation of undesired secondary phases, as may be found in conventional ceramic solids. The secondary phases lead to a reduction in capacitance and lend conventional ceramic solids a yellowish color shade. The consequences of lack of lead balance control are shown taking the reference as an example. The reference may be obtained by sintering in an arrangement according to FIG. 10A. FIG. 10A shows a container body (1) and the container plate (2) and means for providing a gap (4) between container body and container plate. The container of FIG. 10A thus has a gap. The size of the gap amounts to 5 mm. A degree of gas exchange is thus possible between the interior (3) of the container and the surrounding environment. This leads to some of the Pb of the solid being released during sintering in the form of PbO. In contrast to the specimen, the reference obtained in this way has a yellow color shade.

The specimen and reference were obtained as follows:

In both cases first of all green bodies of the same composition were produced. To this end, in each case 34.9494 kg $Mg_{1/3}Nb_{2/3}O_2$, 83.8043 kg $Pb_3O_4$ and 1.7488 kg $TiO_2$ were weighed out. The starting materials were pre-ground to a target d50 grain size of around 1.0 μm in 100 liters of deionized water. The resultant mixture was subjected to spray drying. The mixture was then calcined for 6 hours at 820° C., ground to a d50 grain size of around 0.8 µm and spray-granulated with 3 weight percent PVA binder.

The green bodies were made from the ceramic pellets by compression-molding. The compressed density was 4.8 g/ml. The green bodies were decarbonized at 450° C.

The specimen was obtained by sintering in a closed MgO container according to FIG. 10B. The reference was obtained by sintering in an MgO container according to FIG. 10A. The gap was 5 mm in this case. 1250° C. was selected in each case as the sintering temperature. The retention time at 1250° C. was 4 hours. The degree of filling by volume in the case of the specimen was around 45 vol. %.

The invention is not restricted by the description given with reference to the exemplary embodiments. Rather, the invention encompasses any novel feature and any combination of features, including in particular any combination of features in the claims, even if this feature or this combination is not itself explicitly indicated in the claims or exemplary embodiments.

The invention claimed is:

1. A polycrystalline, ceramic solid comprising:
a main phase with a composition of the general formula:

$$(1-y)Pb_a(Mg_bNb_c)O_{3-e}+yPb_aTi_dO_3$$

with
0.055≤y≤0.065,
0.95≤a≤1.02,
0.29≤b≤0.36,
0.63≤c≤0.66,
0.9≤d≤1.1, and
0≤e≤0.1; and
optionally one or more secondary phases,
wherein, in each section through the solid, a proportion of all secondary phases added together relative to any given cross-sectional area through the solid is less than or equal to 0.5 percent, or
wherein the solid is free of the secondary phases.

2. The solid according to claim 1, wherein, in each section through the solid, the proportion of all secondary phases added together relative to any given cross-sectional area through the solid is less than or equal to 0.3 percent.

3. The solid according to claim 1, wherein the main phase is formed of grains with an average grain size, and wherein the average grain size, measured as a number-related median value using static image analysis, amounts to between 4 µm and 9 µm, inclusive.

4. An electrode comprising:
the solid according to claim 1; and
an electrical contact arranged at the solid.

5. A method for producing a polycrystalline, ceramic solid, wherein the solid comprises
a main phase with a composition of the general formula:

$$(1-y)Pb_a(Mg_bNb_c)O_{3-e}+yPb_aTi_dO_3,$$

with
0.055≤y≤0.065,
0.95≤a≤1.02,
0.29≤b≤0.36,
0.63≤c≤0.66,
0.9≤d≤1.1, and
0≤e≤0.1; and
optionally one or more secondary phases,
wherein, in each section through the solid, a proportion of all secondary phases added together relative to any given cross-sectional area through the solid is less than or equal to 0.5 percent, or wherein the solid is free of the secondary phases, the method comprising:
providing starting materials comprising elements Mg, Nb, Ti and Pb;
producing a mixture comprising the starting materials;
calcining the mixture to produce a calcined mixture;
processing the calcined mixture into a green body; and
sintering the green body,
wherein, to control a lead content, sintering the green body proceeds in a closed system.

6. The method according to claim 5, further comprising adding in excess a Pb-containing starting material prior to sintering the green body.

7. The method according to claim 5, wherein a first starting material of the starting materials is $Mg_{1/3}Nb_{2/3}O_2$.

8. The method according to claim 5, wherein a second starting material of the starting materials is $TiO_2$.

9. The method according to claim 5, wherein in a third starting material of the starting materials is PbO or $Pb_3O_4$.

10. The method according to claim 5, wherein producing the mixture comprises producing the mixture by wet grinding.

11. The method according to claim 5, wherein the calcining the mixture comprises calcining the mixture at a temperature of between 800° C. and 860° C. inclusive.

12. The method according to claim 5, further comprising adding $TiO_2$ and/or $Nb_2O_5$ to the calcined mixture before processing the calcined mixture, wherein a proportion of added $TiO_2$ and/or $Nb_2O_5$ amounts to 0.01 to 0.4 weight percent relative to a weight of the calcined mixture.

13. The method according to claim 5, wherein processing the calcined mixture comprises:
grinding the calcined mixture;
adding a binder to the calcined mixture;
spray drying the calcined mixture with the binder to produce ceramic pellets; and
compression-molding the ceramic pellets to produce the green body.

14. The method according to claim 5, wherein sintering the green body comprises sintering at a temperature of 1150° C. to 1280° C. inclusive.

15. The method according to claim 5, wherein sintering the green body proceeds in the closed system, wherein the closed system is a closed container, and wherein the container contains at least one of the materials selected from the group consisting of $Al_2O_3$, $ZrO_2$ and MgO.

16. The method according to claim 15, wherein the closed container has an interior in which one or more green bodies are arranged such that the degree of filling by volume of all the green bodies relative to the volume of the interior amounts to at least 30 vol. %.

17. A method for producing an electrode, the method comprising:
performing the method for producing the solid according to claim 5; and
applying an electrical contact to the solid.

18. The method according to claim 17, wherein the electrical contact is applied by applying and stoving a paste, and wherein the stoving is performed at a temperature of 680° C. to 760° C. inclusive.

19. A polycrystalline, ceramic solid comprising:
a main phase with a composition of the general formula:

$$(1-y)Pb_a(Mg_bNb_c)O_{3-e}+yPb_aTi_dO_3$$

with
0.055≤y≤0.065,
0.95≤a≤1.02, $0.29 \leq b \leq 0.36$,
$0.63 \leq c \leq 0.69$,
$0.9 \leq d \leq 1.1$, and
$0 \leq e \leq 0.1$; and
optionally one or more secondary phases,
wherein the main phase is formed of grains with an average grain size,
wherein the average size, measured as a number-related median value using static image analysis, amounts to between 4 µm and 9 µm, inclusive, and
wherein, in each section through the solid, a proportion of all secondary phases added together relative to any given cross-sectional area through the solid is less than or equal to 0.5 per cent, or
wherein the solid is free of the secondary phases.

20. The solid according to claim 19, wherein, in each section through the solid, the proportion of all secondary phases added together relative to any given cross-sectional area through the solid is less than or equal to 0.3 per cent.

21. A method for producing a polycrystalline, ceramic solid,
wherein the solid comprises
a main phase with a composition of the general formula:

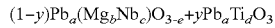

$(1-y)Pb_a(Mg_bNb_c)O_{3-e} + yPb_aTi_dO_3$ with
$0.055 \leq y \leq 0.065$,
$0.95 \leq a \leq 1.02$,
$0.29 \leq b \leq 0.36$,
$0.63 \leq c \leq 0.69$,
$0.9 \leq d \leq 1.1$, and
$0 \leq e \leq 0.1$; and
optionally one or more secondary phases,
wherein, in each section through the solid, a proportion of secondary phases relative to any given cross-sectional area through the solid is less than or equal to 0.5 per cent, or
wherein the solid is free of the secondary phases,
the method further comprises:
providing starting materials comprising elements Mg, Nb, Ti and Pb;
producing a mixture comprising the starting materials;
calcining the mixture to produce a calcined mixture;
adding $TiO_2$ and/or $Nb_2O_5$ to the calcined mixture before processing the calcined mixture, wherein a proportion of added $TiO_2$ and/or $Nb_2O_5$ amounts to 0.01 to 0.4 weight per cent relative to a weight of the calcined mixture
processing the calcined mixture into a green body; and
sintering the green body,
wherein, to control a lead content, sintering the green body proceeds in a closed system.

* * * * *

UNITED STATES PATENT AND TRADEMARK OFFICE
CERTIFICATE OF CORRECTION

| | |
|---|---|
| PATENT NO. | : 11,680,021 B2 |
| APPLICATION NO. | : 16/978147 |
| DATED | : June 20, 2023 |
| INVENTOR(S) | : Manfred Schweinzger |

It is certified that error appears in the above-identified patent and that said Letters Patent is hereby corrected as shown below:

In the Claims

In Column 19, in Claim 19, Line 8, delete "average" and insert -- average grain --, therefor.

Signed and Sealed this
Nineteenth Day of September, 2023

Katherine Kelly Vidal
*Director of the United States Patent and Trademark Office*